United States Patent [19]

McLaughlin

[11] Patent Number: 4,716,065
[45] Date of Patent: Dec. 29, 1987

[54] UNDERLYING PAD FOR ATTACHING REMOVABLE AUTOMOBILE CARPET

[76] Inventor: John J. McLaughlin, 729 Shore Rd., Somers Point, N.J. 08244

[21] Appl. No.: 929,261

[22] Filed: Nov. 10, 1986

Related U.S. Application Data

[63] Continuation-in-part of Ser. No. 752,806, Jul. 6, 1985, abandoned, which is a continuation-in-part of Ser. No. 649,909, Sep. 4, 1984, Pat. No. 4,671,981.

[51] Int. Cl.$^4$ .............................................. B32B 3/06
[52] U.S. Cl. ................................... 428/95; 428/45; 428/47; 428/52; 428/78; 428/99; 428/100; 428/223; 428/900
[58] Field of Search .................. 428/95, 99, 100, 45, 428/47, 52, 78, 223, 900

[56] References Cited

U.S. PATENT DOCUMENTS

| | | | |
|---|---|---|---|
| 4,262,048 | 4/1981 | Mitchell | 428/99 |
| 4,361,610 | 11/1982 | Roth | 428/95 |
| 4,481,240 | 11/1984 | Roth | 428/95 |

Primary Examiner—Marion C. McCamish

[57] ABSTRACT

The specification comprises an underlying pad formed of resilient plastic material atop which is joined detachably a removable carpet, whose area is somewhat smaller than the pad. The removable carpet fits into an opening cut out of the main floor carpet in the well area of an automobile in a manner that has both its surface and the main carpet surface in the same plane; the remaining area of the underlying pad fits under and may be joined to, the main floor carpet.

A modification that permits this combination, an underlying pad with a removable carpet fastened to its upper surface, to be used as a general floor removable carpet provided that an opening is prepared for it in the general floor carpet.

10 Claims, 10 Drawing Figures

FIG. 9
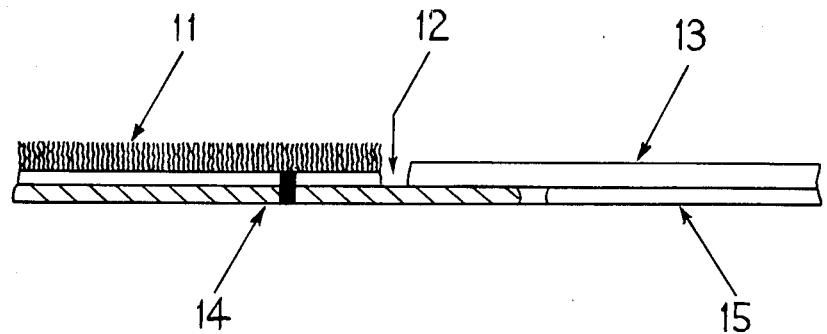
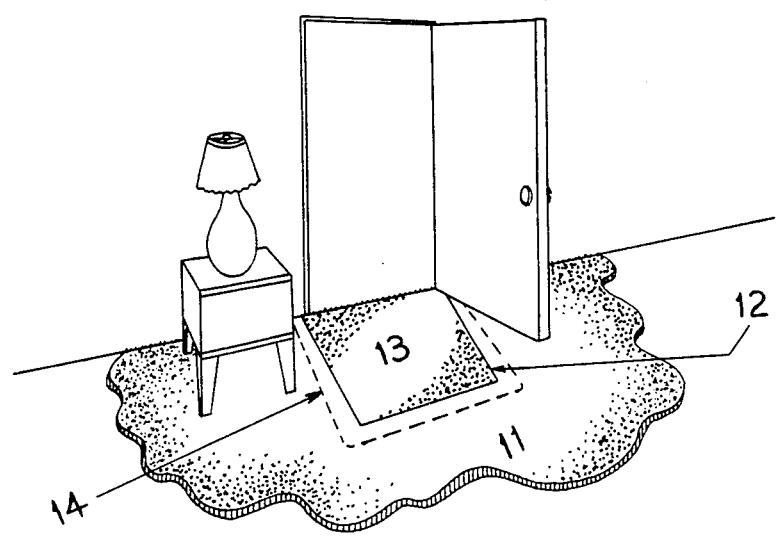
FIG. 10

UNDERLYING PAD FOR ATTACHING REMOVABLE AUTOMOBILE CARPET

This application is a continuation-in part of my earlier application of this title, Ser. No. 06/752,806 filed 07/06/85 now abandoned, which is a continuation-in-part filed 9/4/84, of Ser. No. 06/649,909 titled Removable Automobile Floor Carpet, now U.S. Pat. No. 4,671,981, issued June 9, 1987.

FIELD OF INVENTION

This invention relates to a padded material that fits under an automobile floor carpet and which enjoins by means of a zipper, velcro fastener, or magnetic material a removable carpet that fits into an opening prepared in the main carpet above it. When joined the removable carpet becomes flush with the main carpet to receive debris swept on it for dispersal.

This underlying pad combination should simplify in the assembly stage of manufacture, the position and attaching a removable carpet piece as disclosed in my earlier continuation-in-part application filed on 9/4/84 Ser. No. 06/ 646,909 and titled Removable Automobile Floor Carpet.

Pads placed under carpets are not new and are used routinely to increase carpet life and enhance comfort: there are even some but few found together in automobile flooring and there is no evidence of a pad onto which is attached a detachable carpet.

SUMMARY

In my earlier application titled Removable Automobile Floor Carpet, provision was made for a removable carpet that is in the same plane as the main floor carpet to accept without bi-level hindrance, all dirt brushed onto its surface for lift-off disposal. To keep them in the same plane it is necessary to cut a hole or form an opening through the main automobile carpet. In forming this opening or more particularly attaching one side of a detachable fastener to the main carpet surrounding this opening, there may occur bothersome handling in positioning and fitting the various pieces and in the course of a too short time normal use may be expected to cause some unravelling or unsightly wearing away at the joining edge of the main and hard to replace carpet. Therefore to simplify the process of inserting the removable automobile floor carpet into the opening prepared in the main carpet and to gain whatever carpet rigidity and resiliency is lost by forming that opening and detaching that carpet is the object of adding the underlying pad as described in this application.

It is a further object of this invention to avoid all stress caused to the main floor carpet through repeated detaching and reattaching the removable carpet by transferring the fastener means from the main floor carpet to the underlying pad which by nature of its position away from direct surface contact, can be better constructed to handle it.

It is another object to add rigidity by adhering the bottom surface of the underlying pad to the automobile floor. In this instance the adhered pad may be made doughnut shaped, that is with an opening cut to the shape and position of the removable attached carpet and when the removable carpet is enjoined it would rest on the floor.

While the primary object of this invention is to supply a pad that fits under an automobile floor carpet with a hole cut out of it to receive a carpet detachably mounted atop the pad to effect a flush carpet surface throughout the floor and whose frequent detachments will not mar the main carpet, it can also be used without any modification other than size as an underlying pad that joins by its zipper, velcro or any detachable means a removable general floor carpet for any carpet that is provided with an opening at hard use areas where dirt congregates; such as entrances, pathways, or in front of permanent seating.

BRIEF DESCRIPTION OF THE DRAWINGS

FIGS. 8 & 9 are sectional views of the doughnut shaped underlying pad with the magnetized attached removable carpet.

FIG. 10 is a perspective view of an entrance area carpet.

DESCRIPTION OF THE PREFERRED EMBODIMENTS

This invention features an underlying pad formed of resilient densley packed material, soft to the tread but firm to pressure with a repeated ability to return to size, shape (if shaped) and gauge when pressure is released; made larger in area than the opening cut out of the main automobile carpet (or general floor carpet) and atop which rests a removable carpet joined to it by a surrounding fastener which may be any type fastener able to be attached and detached without the need of tools, but are herein specifically described as those known as zipper, velcro or magnetized material in whole or in part.

The underlying pad with its removable carpet on top inserted into the opening in the main carpet prepared for it, has the end configuration of both carpets (main and removable) in the same plane or with the removable carpet lower than the main floor carpet. The construction of the pad and the removable carpet permits repeated separations without undue deteriation of the threading or bonding of the zipper or velcro strips. A woven fabric backing impregnated into the underlying pad would accomplish this but any means known to the art may be used that would best set the fastener halves in place.

DETAILED DESCRIPTION OF THE PREFERRED EMBODIMENTS
The present invention is now described in detail.

Figure 1:
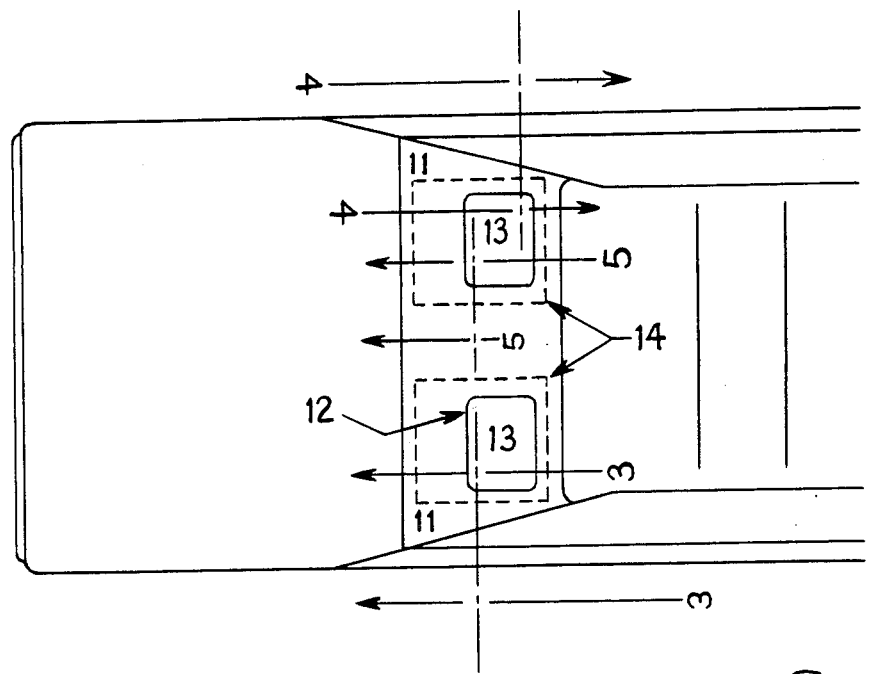
FIG. 1 is an overview of the front half of an automobile.

Referring to FIG. 1 which is an outline of the front seat area of an automobile with the two removable carpets 13 shown in solid line and the two underlying pads 14 in broken line, one each on the driver and passenger side and separated by the main floor carpet 11. One pad 14 may several removable carpets 13.

Figure 2:
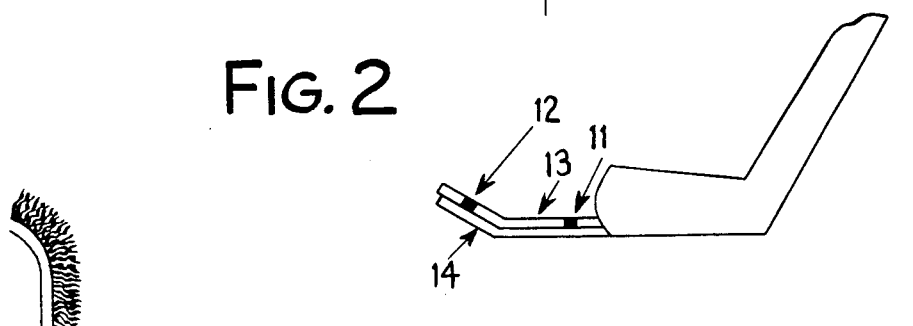
FIG. 2 is a side view of the front seat area.

FIG. 2 indicates in elevation the general configuration of the underlying pad 14 in relation to both carpets, main 11 and removable 13 and the fastener path 12.

Figure 3:
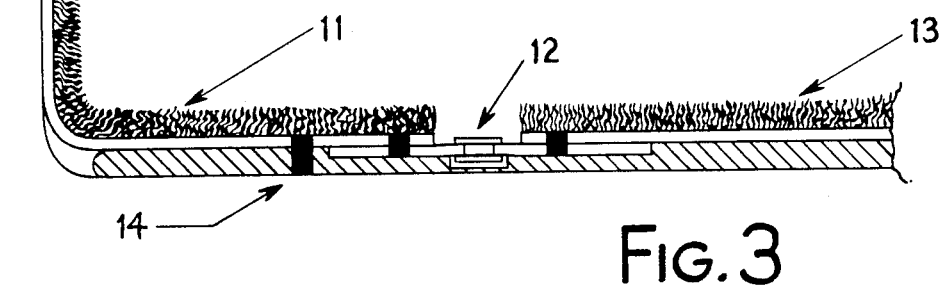
FIGS. 3, 4, & 5 are sections taken along corresponding lines 3—3, 4—4, & 5—5 of FIG. 1.

FIG. 3 has one side of the zipper fastener 12 stitched to the removable carpet 13 which rests on top of the underlying pad 14. The other side of the zipper fastener 12 is stitched to the top surface of the underlying pad 14 and when the zipper halves are joined, the underlying pad 14 and the removable carpet 13 form one piece. To prevent the main carpet's opening edge from curling up it is stitched or adhered to the underlying pad 14. In order to nest the zipper connection 12 the underlying pad 14 is formed with a vacant trough on its top surface. While this channelled design is desirable for the fastening and separating motion and will cushion the stress of being stepped upon repeatedly, it is not mandatory to the manufacture of the underlying pad 14; which may be simply formed of a one thickness, uniform sheet. The underlying pad 14 may be made of natural fiber composition or synthetic rubber or plastic formulation impregnated or coated with a woven fiber material with rigidity suitable for sewing or adhering the zipper fastener half 12. The material characteristics and the technique needed to make this underlying pad is now found in luggage products with their proliferate zipper openings and compartments.

Figure 4:
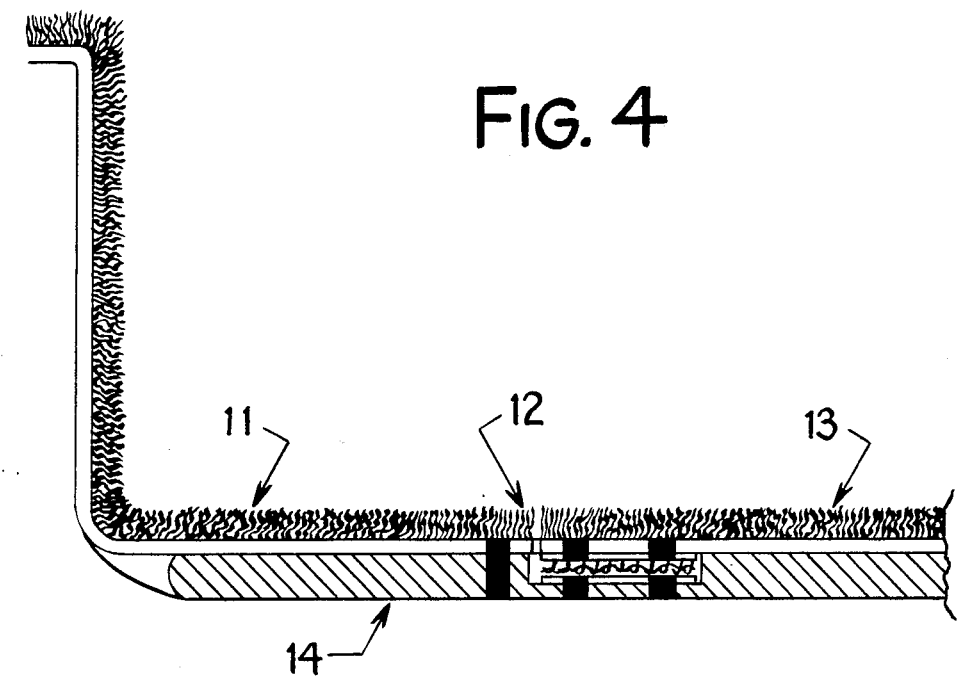

FIG. 4 has one side of the velcro fastener 12 stitched to the top surface of the underlying pad 14 while the top side of the fastener 12 is stitched to the backing of the removable carpet 13. To prevent the formed opening edge of the main floor carpet 11 from wrinkling or curling, it is shown permanently fastened to the underlying pad 14. A vacant channel surrounding path is formed on the top side of the underlying pad 14 to nest the velcro fastener 12 bringing a flush surface to the two carpets, main 11 and removable 13 and a diminished trampling pressure on the fastener 12. This recess may be accomplished in the molding or forming process of manufacturing the underlying pad 14, which can be of any suitable material, natural or manmade, capable of holding the sewing or bonding operations intact as well as all the various properties involved in this invention. A soft plastic imbedded with a woven backing suggests the best assortment to utilize for this underlying pad 14. The velcro type fastener has great tenacious ability from thrust that is derived from any angle except directly overhead and consequently it will tolerate but little full weight trampling that will blunt the velcro barbs wearing away its non-woven cluster half: For this reason the fastener path 12 should be positioned away from direct passenger foot contact and placed close to the seating, front and back, and close too, to the sill and tunnel and forward on the fire wall of the automobile.

Figure 5:
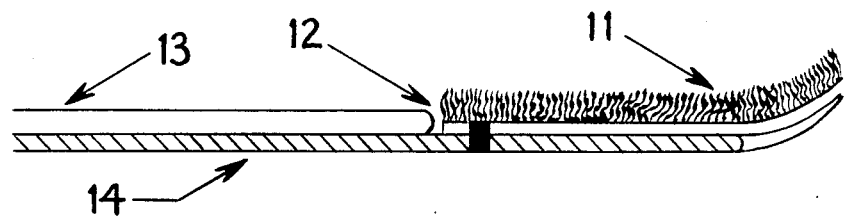

FIG. 5 shows the main automobile carpet 11 stitched to the underlying pad 14 and the removable carpet 13 resting on the underlying pad 14 in the area of the opening cut from the main automobile carpet. The removable carpet backing is constructed of magnetized material of sufficient energy to cling through the underlying pad 14 to the steel automobile floor underneath. In the event that automobile floors are made of some substance that prohibits magnetization, the underlying pad 14 may be made steel fortified to attract and hold the removable carpet 13.

Figure 6:
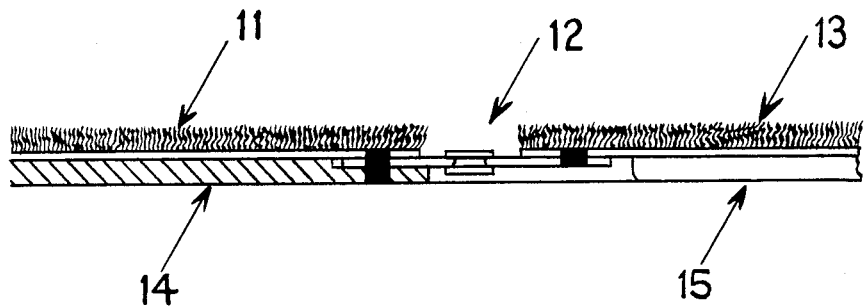
FIG. 6 is a sectional view of the doughnut shaped underlying pad with zipper attachment to the removable carpet.

FIG. 6 is a sectional view of a doughnut shaped underlying pad 14 (a pad with a hole in the center) that leaves only the peripheral surface to be used and which surface is under the main floor carpet 11 and whose bottom surface may be glued to the floor. The underlying pad's 14 inner edging, about one or two inches in width, is stitched to one side of the zipper fastener 12 and the stitching may continue into the backing of the main floor carpet 11. The main floor carpet 11 must be provided with a slight oversize opening, corresponding to the shape of the removable carpet 13. The removable carpet 13 is stitched to the other side of the zipper fastener 12 and when joined to the underlying pad 14 rests either on the floor or as shown on a filler mat 15 whose purpose is to keep the carpet surfaces flush. If this underlying pad 14 with its removable carpet 13 atop is used with ordinary floor carpet 11, the mat usually found under the carpet must also be provided with an opening, in this case it should correspond to the size and shape of the entire underlying pad 14. The doughnut shaped underlying pad 14 may be made from material described in FIG. 3 and with the same stitching and bonding characteristics. The filler 15 may be made of jute or any soft resilient material similar to jute that can be glued to the bottom surface of the removable carpet 13.

Figure 7:
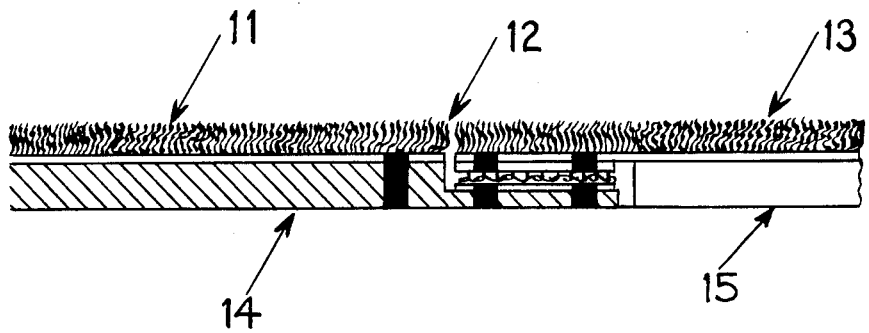
FIG. 7 is a sectional view of the doughnut shaped underlying pad with velcro attachment to the removable carpet.

FIG. 7 is a sectional view of a doughnut shaped underlying pad 14 whose bottom surface may be glued to the floor and whose peripheral top surface is stitched under the main floor carpet 11 and whose remaining inner edge surface is recessed and stitched to the bottom half of a velcro fastener 12. The removable carpet 13 may rest on the floor or as shown on a filler mat 15 whose purpose is to keep the carpet surfaces flush and assist in spreading the pressure from foot trampling on the velcro fastener, to whose upper half it, the removable carpet 13 is stitched. The mat 15 and the underlying pad 14 as well as the two openings are made as instructed in FIG. 6.

Due to the improvments being made to the velcro fastener there may be an installation advantage toward the use of the peeled off type velcro as a permanent fastener, replacing stitching the main carpet 11 to the underlying pad 14. This would require increasing the width of the recess made to the underlying pad 14 to accommodate two velcro strips, one permanently to the main carpet 11 and one temporarily to the removable carpet 13.

Figure 8:
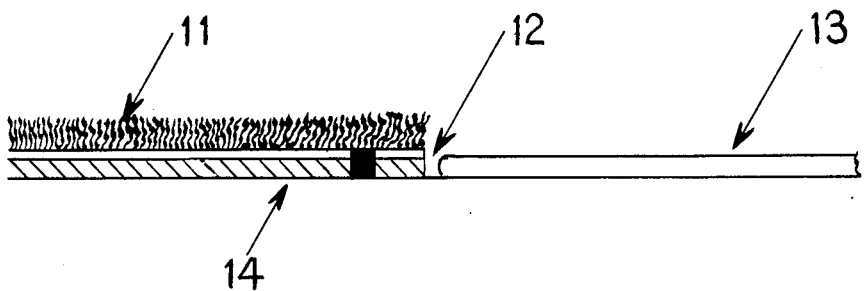

FIG. 8 is a sectional view of a doughnut shaped underlying pad 14 with a magnetized removable carpet 13 resting on the steel automobile floor and FIG. 9 too is a sectional view of a doughnut shaped underlying pad 14 but with its inner edging protruding beyond the main carpet 11 and imparted with a steel substance to attract the magnetized outer edging of the removable carpet 13 which rests on it. The filler mat 15 elsewhere described, is employed here to keep the removable carpet 13 from sagging.

FIG. 10 is a perspective view of an underlying pad 14 (broken line) that may also be doughnut shaped, and atop which is joined a removable carpet 13 whose side abutting the doorway may be left alone but whose other three sides are fastened detachably for a peninsula positioned lift off disposal of the removable carpet debris.

Having described the preferred embodiments I claim:

1. An underlying pad atop which is joined a removable carpet inserted into the opening prepared in the main floor carpet and which is adhered to the main floor carpet and the combination; pad, removable carpet and main carpet forming one piece.

2. An underlying pad that is adhered to the main floor carpet of an automobile and atop which is joined detachably a removable carpet that fits into an opening prepared in the main floor carpet to receive it.

3. A means to construct removable automobile carpets positioned in the openings cut out of the main floor carpet in the well areas of an automobile, with such removable carpets being in the same plane as the main automobile floor carpet, comprising in combination:
   a. Underlying pads that rest on the car floor,
   b. a main automobile floor carpet with the well areas having corresponding openings.
   c. removable carpets that insert into the openings in the main automobile floor carpet, rest on the top of the underlying pad or pads and having one side of a border fastener adhered to the pad (or pads).

4. A means to construct removable automobile carpets positioned in the openings cut out of the main floor carpet in the well areas of an automobile, with such removable carpets being in the same plane as the main automobile floor carpet, comprising in combination:
   a. Underlying pads that rest on the car floor,
   b. a main automobile floor carpet with the well areas having
   c. removable carpets (or coverings) that insert into the openings in the main automobile floor carpet, rest on top of the underlying pad or pads and constructed in whole or in part of magnetic material able to stay in place by attraction to the automobile steel floor.

5. A pad under a floor carpet and adhered to the floor, atop which is joined detachably a removable carpet inserted into an opening in the main floor carpet prepareded for it and when atattached has its surface flush with the main floor carpet.

6. An underlying pad atop which is joined detachably, a removable carpet inserted into the opening prepared in the main floor carpet and which is adhered to the main floor carpet and to the floor with the combination, pad, removable carpet, main floor carpet and the floor all forming one piece.

7. A means to construct a removable floor carpet positioned in the opening (openings) cut out of the main floor carpet at a selected area, with such removable carpet being in the same plane prising in combination;
   a. underlying pad that rests on the floor and to which is permanently joined a fastening means designed to mate a temporary border fastener affixed to a
   b. removable carpet inserted into the selected area opening in the
   c. main floor carpet which is adhered to the peripheral area of the underlying pad.

8. A means to construct a removable floor carpet positioned in the opening (openings) cut out of the main floor carpet at a selected area, with such removable carpet being in the same plane as the main floor carpet comprising in combination;
   a. underlying pad that rests on the floor and is steel fortified,
   b. a main floor carpet with a selected area opening somewhat smaller than the underlying pad,
   c. removable carpet that inserts into the main carpet opening and which rests on top of the underlying pad and is constructed in whole or in part of magnetic material able to stay in place by attraction to the steel fortified section of the underlying pad.

9. A glued to the floor frame shaped underlying pad (pads) with an island or peninsula positioned removable carpet attached to its inner edge for insertion detachably into an opening cut from a selected area of a general floor carpet, in order to have the removable carpet in the same or lower plane than the general carpet, under which the pad rests and to which it may be permanently affixed.

10. An underlying pad that is adhered to the main floor carpet and atop which is joined detachably on three sides, a removable carpet that fits into an opening prepared in the main floor carpet to receive it.

* * * * *